United States Patent [19]

Takizawa et al.

[11] Patent Number: 5,677,724
[45] Date of Patent: Oct. 14, 1997

[54] LASER BEAM PRINTING DEVICE WITH MIRROR ROTATION SPEED CONTROLLED BY ORIGIN SENSOR SIGNAL

[75] Inventors: Noboru Takizawa; Emika Kataoka, both of Kyoto, Japan

[73] Assignee: Rohm Co., Ltd., Kyoto, Japan

[21] Appl. No.: 230,643

[22] Filed: Apr. 21, 1994

[30] Foreign Application Priority Data

Apr. 26, 1993 [JP] Japan ................... 5-121898

[51] Int. Cl.⁶ ................................................. H04N 1/21
[52] U.S. Cl. ................................ 347/250; 347/248
[58] Field of Search ............................. 347/131, 250, 347/248, 235

[56] References Cited

U.S. PATENT DOCUMENTS

| | | | |
|---|---|---|---|
| 3,806,643 | 4/1974 | Russell | 358/496 |
| 4,816,924 | 3/1989 | Sekiya | 347/131 |
| 5,140,349 | 8/1992 | Abe et al. | 347/131 |

Primary Examiner—Mark J. Reinhart
Attorney, Agent, or Firm—Brumbaugh, Graves Donohue & Raymond

[57] ABSTRACT

A laser beam printing device for conducting the print includes a control circuit for controlling a rotation speed of a rotation mirror which reflects the laser beam to scan, an image processing circuit for outputting image information in synchronism with an origin pulse signal, and an origin sensor to receive the laser beam to generate a detection signal and to transmit the signal to the image processing circuit as the origin pulse signal. The control circuit receives the detection signal from the origin sensor as a signal for detecting the rotation speed of the rotation mirror.

4 Claims, 3 Drawing Sheets

5,677,724

LASER BEAM PRINTING DEVICE WITH MIRROR ROTATION SPEED CONTROLLED BY ORIGIN SENSOR SIGNAL

BACKGROUND OF THE INVENTION

The present invention relates to a laser beam printing device, and more specifically, relates to a laser beam printing device such as a laser beam printer (LBP) or a printing device of a copying machine (PPC), a FAX or the like, which adopts a laser beam scan picturing system.

FIG. 3 is a block diagram showing a main portion of a conventional laser beam printer. A laser beam emitted from a laser beam emitting portion 1 is reflected by a rotating polygon mirror 4. The polygon mirror thus scans a photosensitive drum 5 with the laser beam. The intensity of the laser beam is changed by controlling the transmissivity of a liquid crystal shutter 3 in accordance with image information from an image processing circuit 2. As a result, a picture is drawn on the photosensitive drum 5 and the picture image is transferred to a print paper as light and shade of toner so that printing is carried out.

In such a conventional laser beam printing device, it is necessary to carry out the image information processing at the image processing circuit 2 for modulating the intensity of the laser beam synchronistically with the scan of the laser beam. In order to achieve the synchronism, an origin sensor 6 is disposed at an initial position on a scanning line, and a detection signal of the origin sensor 6 is converted into pulses so as to generate an origin pulse signal for the image processing circuit 2. On the other hand, in order to accurately draw a picture, it is necessary to stabilize the scanning state of the laser beam. In order to achieve the stable state, there is provided a position sensor (FG) 8 such as a hall element so as to detect a rotation position of a motor for rotating the polygon mirror. Further, there is also provided a mirror rotation control circuit which detects the change of a rotation speed of the motor in response to a detection signal of the position sensor and restrains the change by PLL or a servo system so that a rotation speed of the motor, that is, a rotation speed of the polygon mirror is controlled to a constant speed.

These image processing circuit and control circuit are indispensable for a system of drawing a picture by scanning the rotating photosensitive drum 5 with the laser beam.

However, recently, there is a severe demand of reducing the cost of a printing device. In order to meet the demand, it is necessary to review the possibility of reducing the scale of a circuit or the like, especially deleting some parts. On the other hand, in order to keep the value of a product, it is impossible to decrease the function and performance, and it is inconvenient to omit circuits necessary to keep the function and performance.

SUMMARY OF THE INVENTION

An object of the present invention is to solve the problems of the prior art, and to realize a laser beam printing device having the structure capable of decreasing the scale without damaging the function and performance.

In order to solve the problems, the laser beam printing device of the present invention comprises a control circuit for controlling a rotation speed of a rotation mirror which reflects a laser beam to scan, so that the rotation speed of the rotation mirror becomes a predetermined speed corresponding to a printing speed; an image processing circuit for keeping image information of an object to be printed, converting the information into a data form corresponding to the scan of the laser beam, and outputting the converted information in synchronism with an origin pulse signal; and an origin sensor disposed at a position corresponding to the origin position of the scan of the laser beam, receiving the laser beam to generate a detection signal, and transmitting the detection signal to the image processing circuit as the origin pulse signal or transmitting the detection signal to a circuit for generating the origin pulse signal as a primary signal of the origin pulse signal, the laser beam printing device performing the print of the image information after the scan of the laser beam, and the control circuit receiving the detection signal from the origin sensor or the origin pulse signal for the image processing circuit as a signal for detecting the rotation speed of the rotation mirror.

Another structure of a laser beam printing device of the present invention to achieve the object is such that in the above laser beam printing device, the control circuit and the image processing circuit are digital circuit of clock synchronizing type, and the same oscillation signal is used as a basic clock for these circuits.

In the laser beam printing device of the present invention having such structure, the detection signal from the origin sensor, which is necessary to generate the origin pulse signal of the image processing circuit, is also used by the control circuit as a signal for detecting the rotation speed of the rotation mirror. By using the detection signal in both the circuits in such a way, it becomes unneccesary to independently generate a detection signal for controlling the rotation mirror. Thus, it is possible to omit the rotation position sensor for the rotation mirror so that the scale of the device can be reduced by the omitted part. The detection signal from the origin sensor is a signal in response to the laser beam scan, and the scan of the laser beam is conducted in response to the rotation of the rotating mirror, so that detection signal from the origin sensor includes information as to rotation position of the rotation mirror and rotation speed based thereon. Thus, the function and performance of the control circuit can be maintained.

Also, in the laser beam printing device of another structure, the control circuit of the rotating mirror is a digital circuit, so that it is possible to make integration by forming an IC contrary to a conventional PLL circuit or the like. Further, since the common basic clock is used in both the image processing circuit and the control circuit, quantizing on the time axis is conducted at the same timing. As a result, as to a quantizing error depending on a clock frequency, the worst value thereof for the same frequency in the present invention is lower than the worst value in a case where the common basic clock is not used for both the circuits since the worst value in the latter case becomes large due to separate generation of quantizing errors. In other words, if the same precision is acceptable, a clock of a lower frequency may be used in the present invention. When the clock frequency is low, the structure of an integration circuit can be made simple. Thus, it is possible to further reduce the scale of the control circuit. Even if the control circuit is constructed by a digital circuit, the function and performance can be maintained by adopting a so-called software servo control system or the like.

DETAILED DESCRIPTION OF THE PREFERRED EMBODIMENTS

Figure 1:
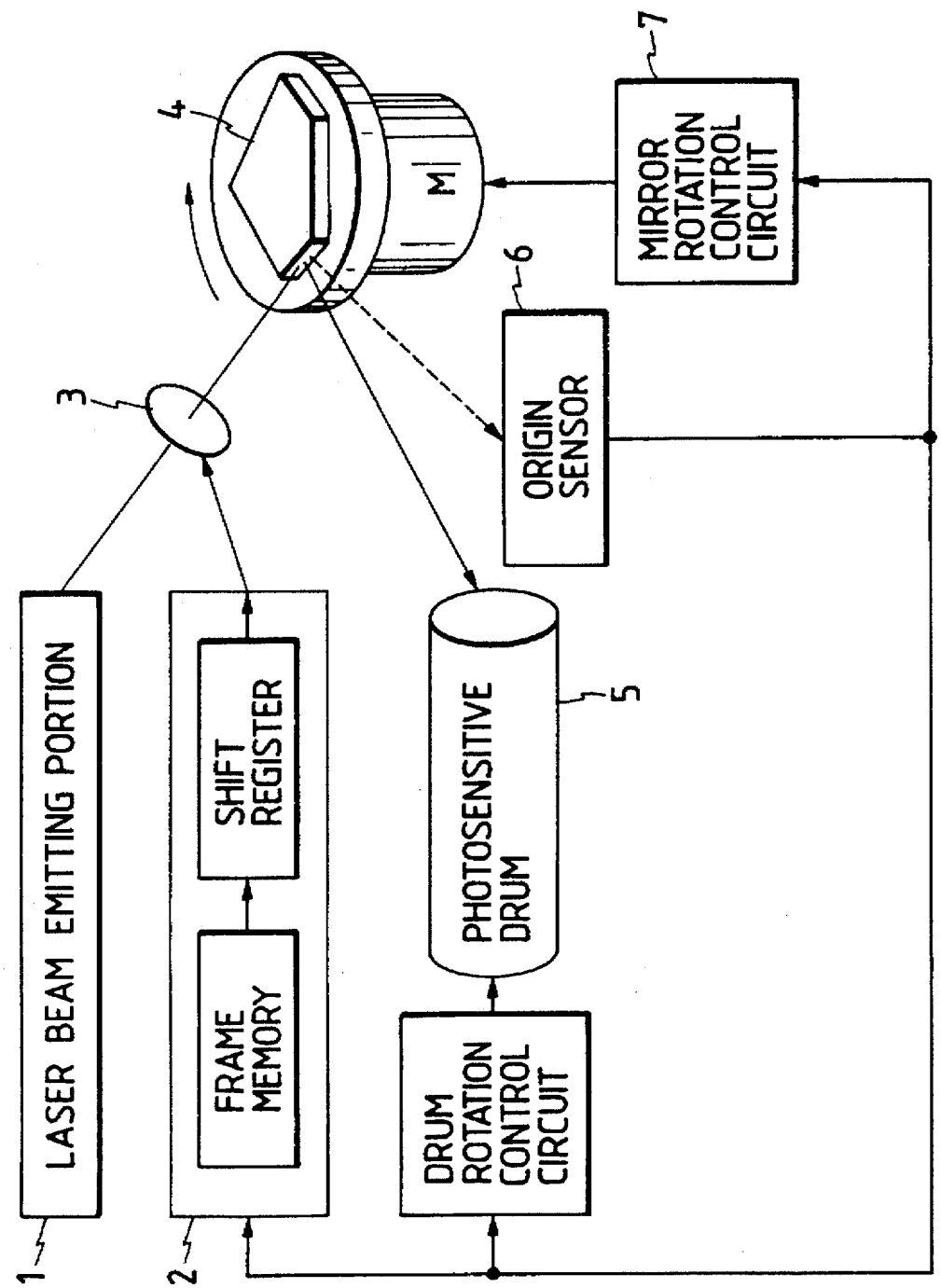
FIG. 1 is a block diagram showing a main portion of a laser beam printer as one example of the laser beam printing device of the present invention.

An embodiment of the present invention will be described below with reference to the accompanying drawings. FIG. 1 is a block diagram showing the main portion of a laser beam printer which is a concrete example of a laser beam printing device of the present invention. In the drawing, a laser beam emitting portion 1 outputs a laser beam from a laser oscillator to a polygon mirror 4 in a constant direction, an image processing circuit 2 keeps image information to be printed, converts the information into serial bits and sends it to a liquid crystal shutter 3, the liquid crystal shutter 3 changes its transmissivity in response to the image information from the image processing circuit 2, the polygon mirror 4 is rotated by a drive motor (M) and reflects the laser beam to scan a photosensitive drum 5 with the laser beam, an origin sensor 6 such as a photo sensor is disposed near the photosensitive drum 5 on the scan line of the laser beam, and a mirror rotation control circuit 7 controls the drive motor (M) of the polygon mirror 4 to make the rotation speed of the polygon mirror 4 constant.

Figure 2:
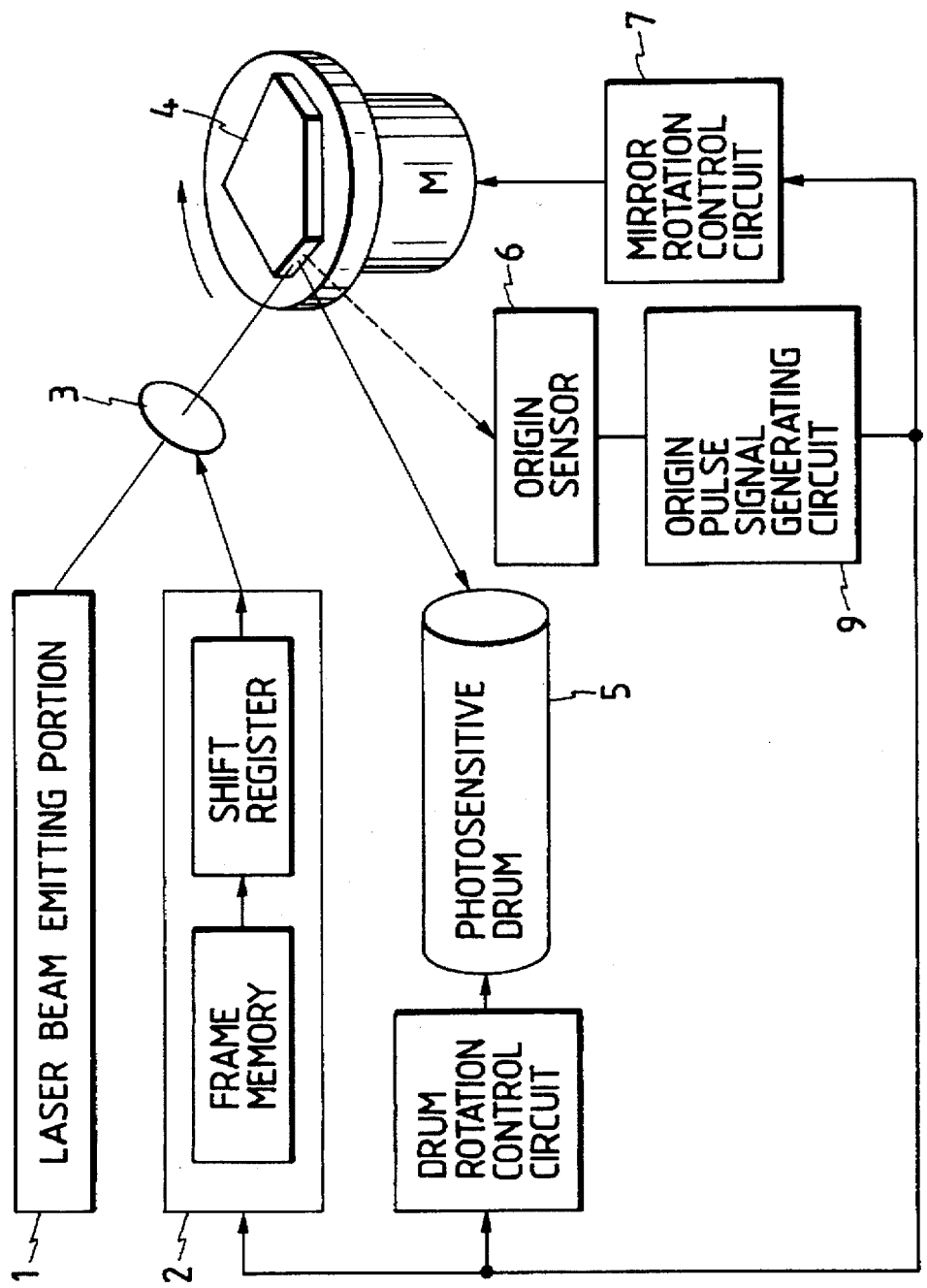
FIG. 2 is a block diagram showing a main portion of a laser beam printer, especially specifying a position of a circuit for generating an origin pulse signal.
Figure 3:
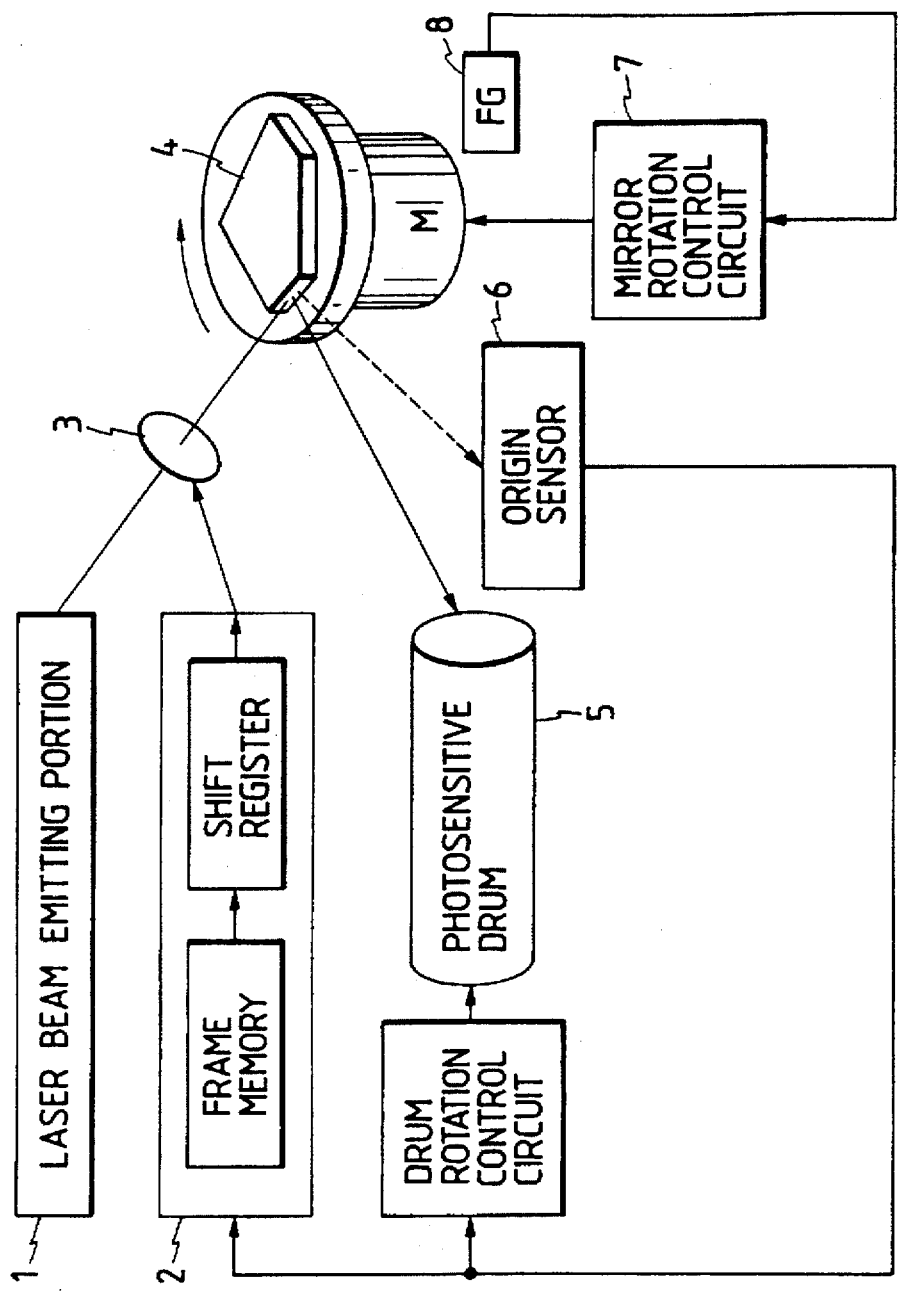
FIG. 3 shows a main portion of a conventional laser beam printer.

As shown in FIG. 2, a circuit 9 for generating an origin pulse signal from a detection signal of the origin sensor 6 is normally disposed near the origin sensor 6. The origin pulse signal is sent to both the image processing circuit 2 and the mirror rotation control circuit 7.

The image processing circuit 2 includes a large capacity frame memory to keep the image information to be printed, and a shift register to convert the data of the image information read from the memory into the serial bit data. According to this, the image information is converted into data format of serial dot pattern corresponding to the scan of the laser beam. When the image processing circuit receives a pulse of detection signal from the origin sensor 6 as an origin pulse signal, the shift register starts a shift operation in synchronism with the pulse signal. As a result, the image information is output in synchronism with the origin pulse signal and is sent to the liquid crystal shutter 3. The circuit 2 receives an oscillation signal (not shown) of 40 MHz, that is, a period of 25 ns, and operates with this signal as clock. Since a scan time for one dot is 125 ns, a quantizing error of this circuit is ⅕ dot or less.

The mirror control circuit 7 includes a counter for receiving and counting an oscillation signal of 40 MHz, and a latch for receiving a pulse of detection signal from the origin sensor 6 and latching the count value of the counter at that time. Further, the circuit 7 includes an MPU into which the value kept by the latch is input. A pulse interval of detection signal is calculated by a program of the MPU. According to this, the circuit 7 detects a rotation period (in this example, since the polygon mirror 4 has 5 faces, accurately speaking, a time of ⅕ of a rotation period is detected) with the precision of 25 ns or less. When the rotation period is obtained, the rotation speed is immediately obtained, which is input to a software servo program. Then, the change of rotation speed of the polygon mirror 4 can be restrained by the control of the software servo program.

Since the precision of rotation period is within 25 ns, a quantizing error in the control circuit 7 is also ⅕ dot or less. If the quantizing errors of the image processing circuit 2 and the mirror rotation control circuit 7 are generated independently from each other, the worst value of the quantizing error of the entire of these circuits reaches ⅖ dot in sum.

However, in the structure of this embodiment, the image processing circuit 2 and the mirror rotation control circuit 7 has the clock of the same 40 MHz oscillation signal. Then, the timing of quantizing in these circuits always coincides, and these circuits are equivalent to a single circuit with respect to quantizing on the time axis. Accordingly, the quantizing errors on the time axis in these circuits are not added to each other, so that the quantizing error in the entire of these circuits is ⅕ dot or less.

In addition to the above described structural elements, the laser beam printer includes a mechanism for transferring a picture image from an input circuit of the image information or the photosensitive drum as toner density, a print paper to which the image is transferred, a paper feed mechanism for feeding the paper and the like. However, the description of these elements is omitted.

The operation of the thus constructed laser beam printer will be described below.

When a power source of the laser beam printer is turned on, the laser beam emitting portion 1 outputs the laser beam continuously. Also, the polygon mirror 4 begins to rotate. When the polygon mirror rotates, the laser beam reflected by the polygon mirror scans the origin sensor 6 and the photosensitive drum 5. In response to the scan, a pulse of detection signal from the origin sensor 6 is transmitted to the mirror rotation control circuit 7. When the rotation control circuit 7 detects that a rotation state of the polygon mirror is late, it controls the polygon mirror 4 to accelerate the rotation thereof. After the rotation speed of the polygon mirror 4 reaches a speed at which the laser beam scans a distance of one dot in a time of 125 ns, the polygon mirror is controlled to keep the speed always. By using the origin sensor 6 in this way, even if a special position sensor is not provided, it is possible to keep the rotation speed of the polygon mirror constant.

When the rotaton speed of the polygon mirror 4 reaches a steady state, preparation of an optical system is completed and becomes in a print enable state. When print data are sent from a host computer (not shown) to the image processing circuit 2, print frame data and the like previously stored are added to the print data to form data of image information of one page consisting of dot patterns. This image information is temporarily stored in the frame memory and is kept. In the data of one page image information, data of the first one line is parallel loaded to the shift register which waits for the pulse of detection signal from the origin sensor 6. When it receives the pulse of the detection signal, the shift operation is conducted by the 40 MHz clock. As a result, it outputs the image information converted into data format corresponding to the scan of the laser beam in synchronism with the origin pulse signal.

This output is sent to the liquid crystal shutter 3, and the transmissivity of the liquid crystal shutter 3 is changed. Thus, the intensity of the laser beam for scanning the photosensitive drum 5 is changed in accordance with the dot pattern data of the image information from the image processing circuit 2. As a result, a picture of one line is drawn on the photosensitive drum 5. When one scan of the laser beam is completed, the photosensitive drum 5 rotates by one dot in the vertical direction. Then, the picture drawing process of the first one line is completed.

Similarly, the second line laser beam scan and rotation of the photosensitive drum 5 are conducted so that the picture drawing process of the second line is completed. Further, when the similar processes for every line are repeated for one page, the picture drawing process for one page is completed.

The image on the photosensitive drum 5 is transferred to a print paper as light and shade of toner, so that printing of one page is conducted.

In this way, when printing information is sent from the host computer, the printing is conducted sequentially.

As is understood from the above description, the laser beam printing device of the present invention comprises a control circuit for controlling a rotation speed of a rotation mirror which reflects a laser beam to scan; an image processing circuit for outputting the image information in synchronism with an origin pulse signal; and an origin sensor receiving the laser beam to generate a detection signal and to transmit the detection signal to the image processing circuit as the origin pulse signal, the laser beam printing device performing the print, and the control circuit receiving the detection signal from the origin sensor as a signal for detecting the rotation speed of the rotation mirror. Thus, the origin sensor is also used as a rotation position sensor.

Accordingly, the scale of the device can be reduced without damaging the function and performance.

In another structure of a laser beam printing device of the present invention, in addition to the above structure, the control circuit and the image processing circuit are digital circuit of clock synchronizing type, and the same oscillation signal is used as a basic clock for these circuits. Thus, the degree of integration of the circuit can be made high.

Accordingly, the scale of the device can be further reduced without damaging the function and performance.

What is claimed is:

1. A laser beam printing device for printing image information by scanning of a laser beam, comprising:

a control circuit for controlling a rotation speed of a rotation mirror which reflects a laser beam to scan, so that the rotation speed of the rotation mirror becomes a predetermined speed corresponding to a printing speed;

an image processing circuit for keeping image information of an object to be printed, converting the information into a data form corresponding to the scan of the laser beam, and outputting the converted information in synchronism with an origin pulse signal; and an origin sensor disposed at a position corresponding to an origin position of the scan of the laser beam, receiving the laser beam to generate a detection signal, and transmitting the detection signal to the image processing circuit as the origin pulse signal, wherein the control circuit receives the detection signal from the origin sensor or the origin pulse signal for the image processing circuit as a signal for detecting the rotation speed of the rotation mirror without requiring separate rotation detection for the rotation mirror.

2. A laser beam printing device for printing image information by scanning of a laser beam, comprising:

a control circuit for controlling a rotation speed of a rotation mirror which reflects a laser beam to scan, so that the rotation speed of the rotation mirror becomes a predetermined speed corresponding to a printing speed;

an image processing circuit for keeping image information of an object to be printed, converting the information into a data form corresponding to the scan of the laser beam, and outputting the converted information in synchronism with an origin pulse signal; and an origin sensor disposed at a position corresponding to an origin position of the scan of the laser beam, receiving the laser beam to generate a detection signal, and transmitting the detection signal to a circuit for generating the origin pulse signal as a primary signal of the origin pulse signal, wherein the control circuit receives the origin pulse signal for the image processing circuit as a signal for detecting the rotation speed of the rotation mirror without requiring separate rotation detection for the rotation mirror.

3. A laser beam printing device as claimed in claim 1, wherein the control circuit and the image processing circuit are digital circuit of clock synchronizing type, and the same oscillation signal is used as a basic clock for these circuits.

4. A laser beam printing device as claimed in claim 2, wherein the control circuit and the image processing circuit are digital circuits of clock synchronizing type, and the same oscillation signal is used as a basic clock for these circuits.

* * * * *